Figure 1:
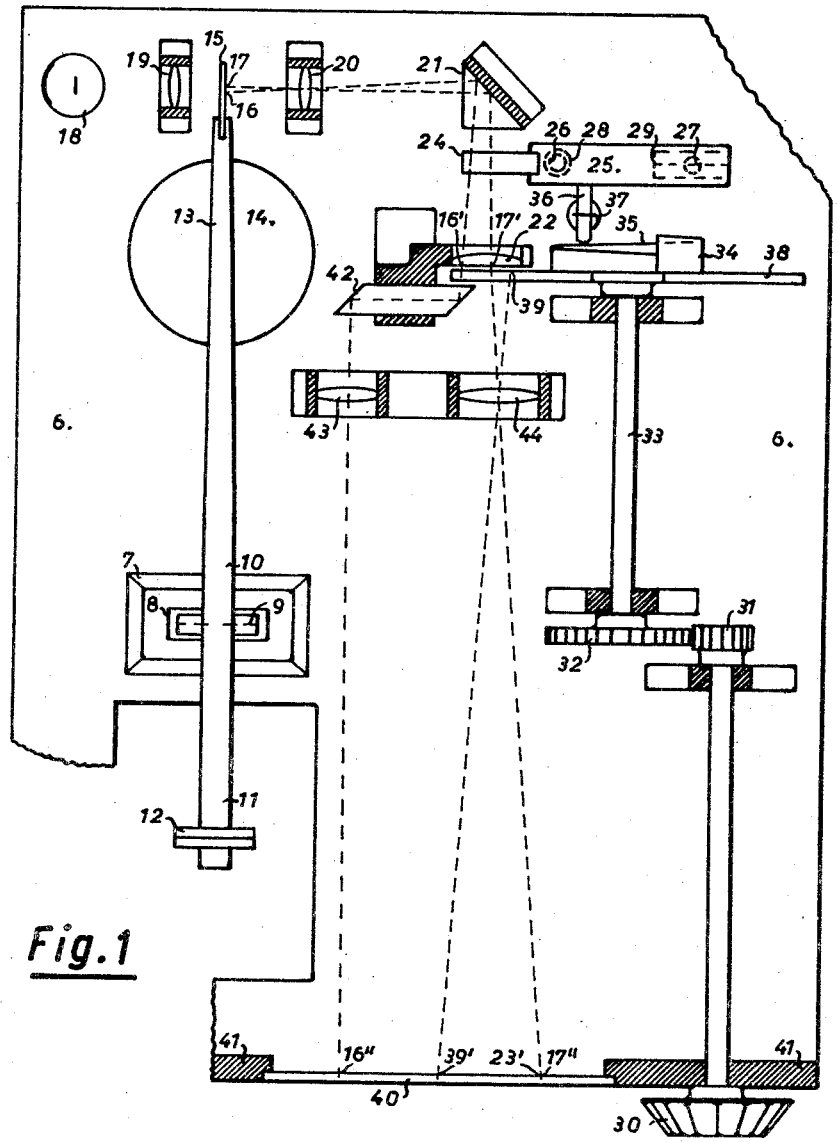

Sept. 11, 1962

J. MEIER 3,053,143

READ-OFF DEVICE ON A BALANCE

Filed June 8, 1961

2 Sheets-Sheet 1

Sept. 11, 1962  J. MEIER  3,053,143
READ-OFF DEVICE ON A BALANCE
Filed June 8, 1961  2 Sheets-Sheet 2

United States Patent Office 3,053,143
Patented Sept. 11, 1962

3,053,143
READ-OFF DEVICE ON A BALANCE
Johann Meier, Stafa (Zurich), Switzerland, assignor to
Erhard Mettler, Zurich, Switzerland
Filed June 8, 1961, Ser. No. 126,755
Claims priority, application Switzerland Oct. 26, 1960
10 Claims. (Cl. 88—24)

This invention relates to a read-off device on a balance for numerically reading off the weight of the article to be weighed. In a balance, and in particular in an analytical balance, the measurements on the measuring plate fixed to the weighing beam are principally determined by the allowable amount of tilting of the weighing beam. Consequently, if the measuring plate is to be marked with a large number of numerals, such numerals must be of very small dimensions and a correspondingly powerful optical magnification is required. On the other hand, the degree of optical magnification should be extremely constant so that the graduating lines visible on a ground glass will always be spaced the same apparent distance from one another. For these reasons alone, certain limits are set to the degree of optical magnification. In addition, owing to the effect of the arresting mechanism of the balance, the weighing beam can never be always deposited on the supporting means with the same degree of accuracy so that the decisive distance between the measuring plate and the objective of the optical magnifying system is also subjected to fluctuations. Further, the dimensions of the numerals and of the graduating lines cannot be chosen at will and as a result the number of numerals that can be accommodated is restricted.

Objects of the invention are to provide in a read-off device on a balance, a numbered and graduated measuring plate attached to the movable measuring part of the balance, a first optical magnifying system for producing a magnified image of the graduating lines and of the numerals of that part of said measuring plate which dips in the optical axis of this magnifying system, said first magnifying system including means for illuminating said measuring plate, an intermediate carrier having a fiduciary mark extending at least approximately within the optical image plane of said first magnifying system, a movable ray-displacing element inserted in said first optical magnifying system for shifting said image with respect to said fiduciary mark in order to centre one of said optically magnified graduating lines within said fiduciary mark, a manually operable adjusting mechanism for moving said ray-displacing element and having a numbered indicating element which moves therewith and on which the last weight decimals of the article to be weighed can be read off as soon as one of the opically magnified graduating lines has been centered within said fiduciary mark, a second optical magnifying system for a further optical magnification of said image of the numerals of said measuring plate available in the optical image plane of said first optical magnifying system, and a third optical magnifying system for a further optical magnification of said image of the graduating lines of said measuring plate available in the optical image plane of said first optical magnifying system and also for optically magnifying said fiduciary mark, the optical magnification factor of said third optical magnifying system being greater than the optical magnification factor of said second optical magnifying system.

Figure 2:
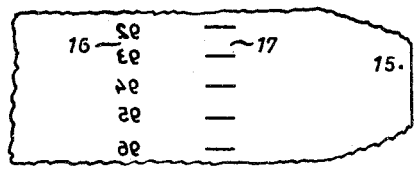
Figure 3:
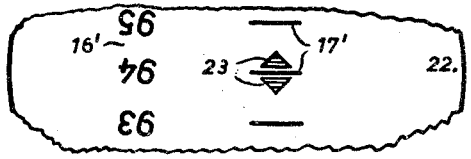
Figure 4:
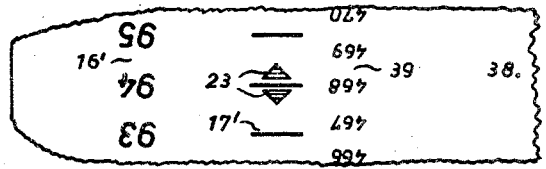
Figure 5:
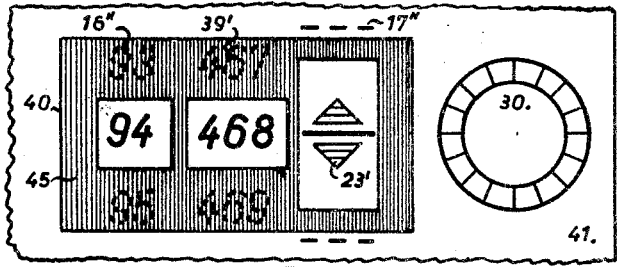

These and other objects and the advantages of the invention will best be understood from the following description of specific embodiments when read in connection with the accompanying drawing in which:

FIG. 1 is a simplified plan view of the mounting plate of an analytical balance, showing in particular the path of the optical rays of the reading device, FIG. 2 is a plan view of the part of the measuring plate located in the path of the rays, shown to a scale about 20 times larger than that of FIG. 1, FIG. 3 is a plan view of the part of the intermediate carrier provided with the fiduciary mark located in the optical image plane of a first optical magnifying system, shown to a scale about ten times larger than that of FIG. 1, FIG. 4 is a plan view of the part of the indicating element located in the optical image plane of a first optical magnifying system, shown to a scale equal to that of FIG. 3, and FIG. 5 is a front elevation of the ground glass plate and the operating head of a adjusting mechanism, shown to a scale equal to that of FIG. 1.

On the mounting plate 6 of an analytical balance, there is provided a short column 7 the upper end of which carries the pan 8 for supporting the central knife edge 9 of the weighing beam 10. The shorter arm 11 of the weighing beam 10 carries the outer knife edge 12 on which there is supported the suspension carrying the weighing dish and the shift weights. This suspension, the weighing dish, the shift weights as well as the shifting mechanism for applying and withdrawing the shift weights are not illustrated for purpose of clarity. The longer weighing beam arm 13 is provided with a counterweight 14 fixed thereto and with a measuring plate 15 at its end. The measuring plate 15 is, for example, of glass and extends in the direction of movement of the longer beam arm 13. To read off the weight decimals of the article to be weighed as determined by the instantaneous inclination of the weighing beam 10, the measuring plate 15 is provided with a series 16 of consecutive whole numbers and a series 17 of corresponding graduation lines, as shown in the short portion of the measuring plate 15 of FIG. 2. It is assumed that the series of numbers comprises the numerals 0 to 99 and that a graduating line is associated with each of these numbers. For the purpose of forming an optical image of the number plate 15, a mirror image of the numerals is applied. The series of numbers 16 and the series of graduating lines 17 extend along arcs of circles the centre of which lies in the central knife edge 9 of the weighing beam 10. Viewed in the direction of movement of the longer beam arm 13, the measuring plate 15 has a dimension in the order of one or two centimetres because this corresponds to the usual displacement of the weighing beam of an analytical balance. The numerals themselves therefore have dimensions of a few one-hundredth portions of a millimetre and the spacing of consecutive graduating lines is correspondingly small. Since only a short portion of the measuring plate 15 is shown in the FIG. 2 representation, arcuate curvature of the series 16 of numbers and the series 17 of graduating lines are not evident.

For the purpose of providing an optical image of the number plate 15, a lamp 18 and an optical illuminating system 19 are built on the mounting plate 6. The mounting plate 6 further carries a first optical magnifying system comprising the biconvex objective lens 20, the deviation prism 21 and the plano-convex collecting lens 22. This first optical magnifying system is so dimensioned that the numbers 16 and graduations 17 located in the path of the optical rays are projected as a real and optically magnified image on the plane face of the plano-convex collecting lens 22. The resulting image is shown in FIG. 3, wherein the image of the numerals 16 are designated 16' and the image of the graduating lines 17 are designated 17'. At the place where the graduating lines 17' appear, the plane face of the plano-convex collecting lens 22 is provided with a fiduciary mark 23 in the form of two apparently dark triangles with juxtaposed parallel sides at a small spacing from one another. If the weighing beam 10 is lightly tilted about its central knife edge 9 so that the measuring plate 15 is lifted or lowered, then, in the FIG. 3 representation, the optically magnified graduating lines 17' move in a direction from the top to the bottom or from the bottom to the top, respectively, over the fiduciary mark 23. In the space adjacent to the fiduciary mark 23, the numerals 16' associated with the graduating lines 17' participate in such movement. The magnification produced by this first optical magnifying system 20 to 22 is preferably chosen to be not large, a linear magnification factor of about ten having been found suitable. The numerals 16' therefore appear in the region of the plano-convex collecting lens 22, i.e. in the optical image plane, with dimensions of a few tenths of a millimetre and the spacing between consecutive graduating lines 17' correspond. As shown in FIG. 3, the dimensions of the fiduciary mark 23 should be suitably small relatively to the spacings of the consecutive graduating lines 17'. As an alternative carrier for the fiduciary mark 23, the illustrated plano-convex collecting lens 22 could be replaced by a simple plano-parallel plate of glass or the like. However, the use of a plano-convex collecting lens 22 provides a very desirable better brightness of the optically magnified portion of the measuring plate 15 as well as images of the numerals 16' and the graduating lines 17' that are rich in contrast.

In the path of the first optical magnifying system 20 to 22 there is also included a ray displacing element in the form of a thicker plano-parallel and accurately ground glass plate 24. This glass plate 24 is mounted in a holder 25 which, in turn, is tiltable on two pins 26 and 27 fixed to the mounting plate 6. In order to ensure accurate tilting of the holder 25 without any lateral play, its underside is provided with a conical bore 28 in which the upwardly sharply-pointed pin 26 engages, as well as wedge-shaped recess 29 in which the likewise sharply-pointed pin 27 engages. The plano-parallel plate 24 is thus tiltable about an axis which extends through the points of the two pins 26 and 27. This tiltability ensures that the optically magnified graduating lines 17' in the representation of FIG. 3 can be additionally lifted or lowered until one of these graduating lines 17' is accurately centered between the two triangles constituting the fiduciary mark 23. Tilting of the holder 25 is induced with the aid of an adjusting mechanism which is actuated with a manually-operable knob 30. Via a reduction gearing 31, 32 a shaft 33 is rotated on which there is seated a cam disc 34 having a helical lead face 35. Against this lead face 35 there bears a pin 36 which is fixed in the holder 25 and which is lightly pushed by means of a spring 37. This spring is a spiral spring the lower end of which is hooked into a hook fixed in the mounting plate 6. In FIG. 1, this hook is hidden by the pin 36. The spring 37 not only strives to press the pin 36 against the lead face 35 but also the holder 25 against the supporting pins 26 and 27. Thus, rotation of the knob 30 varies the inclination of the holder 25 and thereby the ray displacing element 24 in accordance with the resulting rotation of the lead face 35. For this, the axis of rotation determined by the point of the supporting pins 26 and 27 and about which the ray displacing element 24 can be titled is preferably horizontal and parallel to the plane face of the plano-convex collecting lens 22. It would be possible to replace the plano-parallel plate 24 with a rotary mirror fixed in the holder 25 or an acute deviating prism. However, upon actuation of the adjusting mechanism 30 to 37 the angle of incidence of the light rays on the plano-convex collecting lens 22 would then be different and this would to a large part lose the desired effect of image brightness. But if the ray displacing element 24, as stated, is a plano-parallel plate, then the light rays are lifted or lowered only parallel to themselves and the collecting lens 22 can be constructed with a view to strong light intensity of the first optical magnifying system 20 to 22.

The amount of tilting of the ray displacing element 24 required to centre one of the optically magnified graduating lines 17' accurately within the fiduciary mark 23 in accordance with FIG. 3, obviously represents a measure of the last weight decimals of the article to be weighed. In order to make these last weight decimals recognisable, an indicating element comprising a glass disc 38 is fixed to the shaft 33. This glass disc 38 is, as shown in FIG. 1, so arranged that its periphery covers the plano-convex collecting lens 22 and its plane face facing the collecting lens 22 is placed the smallest possible distance from the lens 22 and extends parallel to the plane face of the lens 22. This glass disc 38, which is circular, is provided, on the face facing the lens 22, with a series of numbers, for example the numbers 0 to 999, indicating the last weight decimals of the article to be weighed. This series of numbers is applied to the glass disc along an arcuate line which passes the immediate vicinity of the mark 23. FIG. 4 illustrates a section of this glass disc 38 and in this section the numbers 466 to 470 are recognisable, the series of numbers itself being designated 39. If one views through the glass disc 38 in the direction of the lens 22, the image shown in FIG. 4 will be seen. To the left of the series of numbers 39 there can be seen the mark 23 on the collecting lens 22 as well as the series 17' of graduating lines. Still further to the left there is the series 16' of the numerals of the measuring plate 15. As also shown in FIG. 4, the dimensions of the numerals of the series of numbers 39 on the glass disc 38 should be preferably smaller than the dimensions of the numerals of the image 16' of the optically magnified series of numbers 16. The numbers 39 on the glass disc 38 therefore have linear dimensions which are likewise in the order of only a few tenths of a millimetre so that even for a series of 0 to 999 a corresponding small diameter of the glass disc suffices. Finally, FIGS. 1 to 4 show that the first optical magnifying system 20 to 22 is so dimensioned that the numerals of the series of numbers 39 adjacent the fiduciary mark 23 are also brightly illuminated by the bunched light rays emanating from the lamp 18.

The resulting total image according to FIG. 4 is now again magnified by means of further optical magnifying systems and projected on to a ground glass disc 40 which is, for example, let into an end wall 41 on the mounting plate 6. In the illustrated embodiment, a separated optical magnification for the series of numbers 16' on the one hand and for the series of lines 17', the mark 23 and the series of numbers 39 on the other hand is shown. For this purpose, a second magnifying system is provided which includes a rhombic prism 42 and an objective 43. The rhombic prism 42 is applied immediately behind the glass disc 38 and by means of this prism the path of the optical rays corresponding to the series of numerals 16' is displaced to the left. The series of numerals 16' are magnified alone so that on the immediate left of the ground glass 40 there appears the image 16'' according to which the number 94 becomes visible in the centre of the ground glass 40. By means of a third optical magnifying system comprising the objective 44, the fiduciary mark 23, the series of lines 17' as well as the series of numerals 39 are magnified together. On the adjoining right-hand side of the ground glass 40 there will therefore appear the optical image 39' of the series of numbers 39 and the optical image 17" of the series of lines 17' together with the optical image 23' of the fiduciary mark 23 in an arrangement as shown in FIG. 5. The optical magnification of the third optical magnifying system is chosen to be greater than the optical magnification of the second magnifying system. This ensures that the numbers of the series 39' will appear the same size on the ground glass 40 as the numbers of the series 16". In this way, the apparent spacings of consecutive lines 17" on the ground glass 40 will now be larger than the spacings of consecutive numbers of the series 16". This is of advantage with a view to accurate centring of one of the lines 17" in the mark 23'. In the practical embodiment of the reading device, it has been shown preferable to use an approximately five times optical magnification of the second magnifying system 42 to 43 and an approximately 20 times optical magnification of the third magnifying system 44.

In order to make the readable result, in the case illustrated in FIGS. 2 to 5 the number 94.468, well recognizable, the ground glass 40 may have applied to it a totally or semi-opaque covering layer 45 (FIG. 5), which only leaves the three windows as shown. It is also possible to apply this covering layer and its window definitions to the plane face of the plano-convex lens 22.

In the space to the left of the ground glass 40 there is generally a further window in the end wall 41. In this window there appear the first weight decimals of the article to be weighed as determined by the applied or withdrawn shifting weights of the balance. For the purpose of clarity, these further means are not shown in the drawing. To the right and possibly somewhat below the ground glass 40 there preferably projects the operating knob 30 of the adjusting mechanism 30 to 37 in order to facilitate manipulation.

Finally, a somewhat simpler variation of the reading device according to the invention can be obtained by omitting the rhombic prism 42 and the objective lens 43. The entire optical magnification in the second stage must then take place with the aid of the objective 44. In this case, in order to ensure that the numerically correct arrangement of all the numbers shown in FIG. 5 may likewise appear on the ground glass 40, the series of numbers 16' in FIG. 3 and 4 must run to the right from the series 39 whilst on the measuring plate 15 the series 16 should be applied to the right from the series of lines 17. This variation also provides the same basic advantages. The attainable accuracy is practically given by the linear magnification factor of the first optical magnifying system 20 to 22 whilst no high requirements are called for in the constancy of the further optical magnifying system 44. However, the distance between consecutive lines 17" will then be equal to the distance of consecutive numerals 16" as viewed on the ground glass 40.

The invention is not limited to the particular embodiments herein shown and described and further modifications which may occur to those familiar with the art fall within the spirit and scope of the invention as set forth in the following claims.

I claim:

1. A read-off device on a balance for numerically reading off the weight of the article being weighed, including a numbered and graduated measuring plate attached to the movable measuring part of the balance, a first optical magnifying system for producing a magnified image of the graduating lines and of the numerals of that part of said measuring plate which dips in the optical axes of this magnifying system, an intermediate carrier having a fiduciary mark extending at least approximately within the optical image plane of said first optical magnifying system, a movable ray displacing element inserted in said first optical magnifying system for shifting said magnified image with respect to said fiduciary mark in order to centre one of said optically magnified graduating lines within said fiduciary mark, a manually operable adjusting mechanism for moving said ray displacing element, a numbered indicating element moving together with said adjusting mechanism and which is so arranged relatively to said intermediate carrier that the numerals to be read off said indicating element are located in the immediate vicinity of said fiduciary mark and at least approximately within the optical image plane of said first optical magnifying system, and a second optical magnifying system for a further optical magnification of the image of the graduating lines and of the numerals of said measuring plate available in the optical image plane of said first optical magnifying system, and also for optically magnifying said fiduciary mark as well as the numerals to be read from said indicating element.

2. The invention as recited in claim 1, wherein said intermediate carrier comprises a glass member having a plane face facing said indicating element, said fiduciary mark being applied on to said plane face of said glass member, and wherein said indicating element is a glass disc arranged at a small spacing from said plane face of said glass member and extending parallel thereto, the numbers to be read off being applied on its surface facing said glass member.

3. The invention as recited in claim 2, wherein said glass member is a plano-convex collecting lens of which the plane face faces said indicating element.

4. The invention as recited in claim 2, wherein said ray-displacing element is a plano-parallel glass plate which is tiltably mounted about a rotary axis extending parallel to the plane face of said glass member.

5. The invention as recited in claim 1, wherein the numerals on said indicating element have dimensions at least approximately of the same size as the dimensions of the optical images of the optically magnified numbers of said measuring plate produced with the aid of said first optical magnifying system.

6. A read-off device on a balance for numerically reading off the weight of the article to be weighed, including a numbered and graduated measuring plate attached to the movable part of the balance, a first optical magnifying system for producing a magnified image of the graduating lines and of the numerals of that part of said measuring plate which dips in the optical axis of this magnifying system, said first magnifying system including means for illuminating said measuring plate, an intermediate carrier having a fiduciary mark extending at least approximately within the optical image plane of said first optical magnifying system, a movable ray displacing element inserted in said first optical magnifying system for shifting said magnified image with respect to said fiduciary mark in order to centre one of said optically magnified graduating lines within said fiduciary mark, a manually operable adjusting mechanism for moving said ray displacing element and having a numbered indicating element which moves therewith and on which the last weight decimals of the article to be weighed can be read off as soon as one of the optically magnified graduating lines has been centered within said fiduciary mark, a second optical magnifying system for a further optical magnification of the image of the numerals of said measuring plate available in the optical image plane of said first optical magnifying system, and a third optical magnifying system for a further optical magnification of the image of the graduating lines of said measuring plate available in the optical image plane of said first optical magnifying system and also for optically magnifying said fiduciary mark, the optical magnification factor of said third optical magnifying system being greater than the optical magnification factor of said second optical magnifying system.

7. The invention as recited in claim 6, wherein said numbered indicating element is a rotatable glass disc extending in and covering said optical image plane of said first optical magnifying system, the numerals to be read from said glass disc being located in such a manner that they are optically magnified by means of said third optical magnifying system.

8. The invention as recited in claim 7, wherein a shaft carries said rotatable glass disc and a cam guide by means of which said ray displacing element is tilted about an axis extending parallel to said glass disc.

9. The invention as recited in claim 6, wherein said second optical magnifying system includes ray deviation means for separating the optical magnification of the numerals from the optical magnification of the graduating lines and of said fiduciary mark.

10. The invention as recited in claim 9, wherein said ray deviation means comprise a rhombic prism inserted between said fiduciary mark and the objective of said second magnifying system.

References Cited in the file of this patent

UNITED STATES PATENTS

| | | |
|---|---|---|
| 1,357,731 | Schaper | Nov. 2, 1920 |
| 2,254,053 | Timson | Aug. 26, 1941 |
| 3,026,620 | Rantsch | Mar. 27, 1962 |